(12) United States Patent
Yang

(10) Patent No.: US 12,019,592 B2
(45) Date of Patent: Jun. 25, 2024

(54) FILE MOVING METHOD, ELECTRONIC DEVICE, AND MEDIUM

(71) Applicant: BEIJING BAIDU NETCOM SCIENCE TECHNOLOGY CO., LTD., Beijing (CN)

(72) Inventor: Yongqiang Yang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 158 days.

(21) Appl. No.: 17/678,648

(22) Filed: Feb. 23, 2022

(65) Prior Publication Data
US 2022/0179832 A1 Jun. 9, 2022

(30) Foreign Application Priority Data
Apr. 22, 2021 (CN) .......................... 202110437229.1

(51) Int. Cl.
  *G06F 16/182* (2019.01)
  *G06F 16/13* (2019.01)
  *H04L 67/1097* (2022.01)

(52) U.S. Cl.
  CPC .......... *G06F 16/183* (2019.01); *G06F 16/134* (2019.01); *H04L 67/1097* (2013.01)

(58) Field of Classification Search
  CPC ...... G06F 16/183; G06F 16/134; G06F 3/061; G06F 3/0643; G06F 3/065; G06F 3/0659;
  (Continued)

(56) References Cited

U.S. PATENT DOCUMENTS

| 10,037,339 B1 | 7/2018 | Kleinpeter et al. |
| 2014/0040196 A1 | 2/2014 | Wijayaratne et al. |

(Continued)

FOREIGN PATENT DOCUMENTS

| CN | 103942269 A | 7/2014 |
| CN | 104166607 A | 11/2014 |

(Continued)

OTHER PUBLICATIONS

Byyuichi Sakuraba, "Java SE 7/8; Project Coin/ NIO.2/ Stream API/ Data and Time API," Sun World, Java, 1995, 6 pages.

(Continued)

*Primary Examiner* — Hosain T Alam
*Assistant Examiner* — Chongsuh Park
(74) *Attorney, Agent, or Firm* — Seed IP Law Group LLP

(57) ABSTRACT

A file moving method, an electronic device, and a computer-readable storage medium are provided. An implementation includes: in response to receiving a file moving request, determining a source path and a destination path corresponding to a first moving operation corresponding to the request; determining whether the source path and the destination path corresponding to the first moving operation exist; in response to determining that both the source path and the destination path corresponding to the first moving operation exist, comparing at least one of the source path and the destination path corresponding to the first moving operation with a corresponding path of a source path and a destination path corresponding to the second moving operation; and determining, based on a result of the comparing, whether the first moving operation is to be performed.

13 Claims, 8 Drawing Sheets

(58) Field of Classification Search
CPC ........ G06F 3/067; G06F 16/16; G06F 3/0607; G06F 3/0647; G06F 16/119; G06F 16/1748; G06F 16/185; G06F 16/192; H04L 67/1097
See application file for complete search history.

(56) References Cited

U.S. PATENT DOCUMENTS

| | | | |
|---|---|---|---|
| 2014/0237024 A1* | 8/2014 | Chen | H04L 51/234 |
| | | | 709/203 |
| 2018/0189311 A1* | 7/2018 | Newhouse | G06F 21/52 |
| 2020/0073957 A1 | 3/2020 | Shea et al. | |

FOREIGN PATENT DOCUMENTS

| | | |
|---|---|---|
| CN | 105446789 A | 3/2016 |
| CN | 110445837 A | 11/2019 |
| CN | 112286876 A | 1/2021 |
| JP | 2010039988 A | 2/2010 |
| JP | 2012027733 A | 2/2012 |
| JP | 2020184192 A | 11/2020 |

OTHER PUBLICATIONS

Kudo et al., "Study of Secure Management of Shared Network Devices," The Institute of Electronics, Networking Research Laboratories, NEC Corporation, Japan, 2004, 9 pages.
Takayasu et al., "Introduction to Big Data Analysis," 2014, 5 pages.

* cited by examiner

FILE MOVING METHOD, ELECTRONIC DEVICE, AND MEDIUM

CROSS REFERENCE TO RELATED APPLICATION

This application claims priority from Chinese Patent Application No. 2021104372291, filed on Apr. 22, 2021, the contents of which are hereby incorporated by reference in their entirety for all purposes.

BACKGROUND

Technical Field

The present disclosure relates to the field of cloud computing, in particular to the field of cloud storage technologies, and specifically to a file moving method and apparatus, an electronic device, a computer-readable storage medium, and a computer program product.

Description of the Related Art

Cloud computing (cloud computing) refers to a technology system that accesses a flexible and scalable shared physical or virtual resource pool via a network, and deploys and manages resources in a self-service manner as required, where the resources may include a server, an operating system, a network, software, an application, a storage device, etc. The use of cloud computing technologies can provide efficient and powerful data processing capabilities for application and model training of artificial intelligence, blockchain, and other technologies.

A directory structure is very common in a file system. For example, a directory is used to form a tree structure to help sort and organize various files, folders, etc. "Move a file" is also referred to as "rename." Moving files/directories is one of the standard operations supported in a file system. However, fully concurrent moving operations may cause a loop in a directory tree.

In order to avoid the loop in the directory tree, a global lock mechanism may usually be used, that is, all renaming operations are queued by using a lock and performed sequentially, to prevent a concurrent operation. However, the global lock mechanism causes all the renaming operations to be queued and performed sequentially, which is inefficient.

BRIEF SUMMARY

The present disclosure provides a file moving method and apparatus, an electronic device, a computer-readable storage medium, and a computer program product.

According to an aspect of the present disclosure, there is provided a file moving method, including: in response to receiving a file moving request, determining a source path and a destination path corresponding to a first moving operation, where the first moving operation is a moving operation that is to be performed and corresponds to the file moving request; in response to determining that both the source path corresponding to the first moving operation or the destination path corresponding to the first moving operation exist, comparing at least one of the source path corresponding to the first moving operation or the destination path corresponding to the first moving operation with a corresponding path of a source path corresponding to a second moving operation or a destination path corresponding to the second moving operation, where the second moving operation is a moving operation that is being performed; and determining, based on a result of the comparing, whether the first moving operation is to be performed.

According to an aspect of the present disclosure, there is provided an electronic device, including: at least one processor; and a memory communicatively connected to the at least one processor, where the memory stores instructions executable by the at least one processor, and when executed by the at least one processor, the instructions cause the at least one processor to perform: in response to receiving a file moving request, determining a source path and a destination path corresponding to a first moving operation, where the first moving operation is a moving operation that is to be performed and corresponds to the file moving request; in response to determining that both the source path corresponding to the first moving operation or the destination path corresponding to the first moving operation exist, comparing at least one of the source path corresponding to the first moving operation or the destination path corresponding to the first moving operation with a corresponding path of a source path corresponding to a second moving operation or a destination path corresponding to the second moving operation, where the second moving operation is a moving operation that is being performed; and determining, based on a result of the comparing, whether the first moving operation is to be performed.

According to an aspect of the present disclosure, there is provided a non-transitory computer-readable storage medium storing computer instructions, where the computer instructions are used to cause a computer to perform: in response to receiving a file moving request, determining a source path and a destination path corresponding to a first moving operation, where the first moving operation is a moving operation that is to be performed and corresponds to the file moving request; in response to determining that both the source path corresponding to the first moving operation or the destination path corresponding to the first moving operation exist, comparing at least one of the source path corresponding to the first moving operation or the destination path corresponding to the first moving operation with a corresponding path of a source path corresponding to a second moving operation or a destination path corresponding to the second moving operation, where the second moving operation is a moving operation that is being performed; and determining, based on a result of the comparing, whether the first moving operation is to be performed.

According to one or more embodiments of the present disclosure, a path for a moving operation to be performed is compared with that for a moving operation being performed, to avoid the possibility of occurrence of a loop caused by a "reverse" operation, and a degree of concurrency of moving files in most scenarios is greatly improved, thereby improving operating efficiency.

It should be understood that the content described in this section is not intended to identify critical or important features of the embodiments of the present disclosure, and is not used to limit the scope of the present disclosure. Other features of the present disclosure will be easily understood through the following specification.

BRIEF DESCRIPTION OF THE SEVERAL VIEWS OF THE DRAWINGS

The drawings show example embodiments and form a part of the specification, and are used to explain example implementations of the embodiments together with a written description of the specification. The embodiments shown are merely for illustrative purposes and do not limit the scope of the claims. Throughout the drawings, identical reference signs denote similar but not necessarily identical elements.

DETAILED DESCRIPTION

Example embodiments of the present disclosure are described below in conjunction with the accompanying drawings, where various details of the embodiments of the present disclosure are included to facilitate understanding, and should only be considered as examples. Therefore, those of ordinary skill in the art should be aware that various changes and modifications can be made to the embodiments described herein, without departing from the scope of the present disclosure. Likewise, for clarity and conciseness, description of well-known functions and structures are omitted in the following description.

In the present disclosure, unless otherwise stated, the terms "first," "second," etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed items.

Embodiments of the present disclosure will be described below in detail in conjunction with the drawings.

Figure 1:
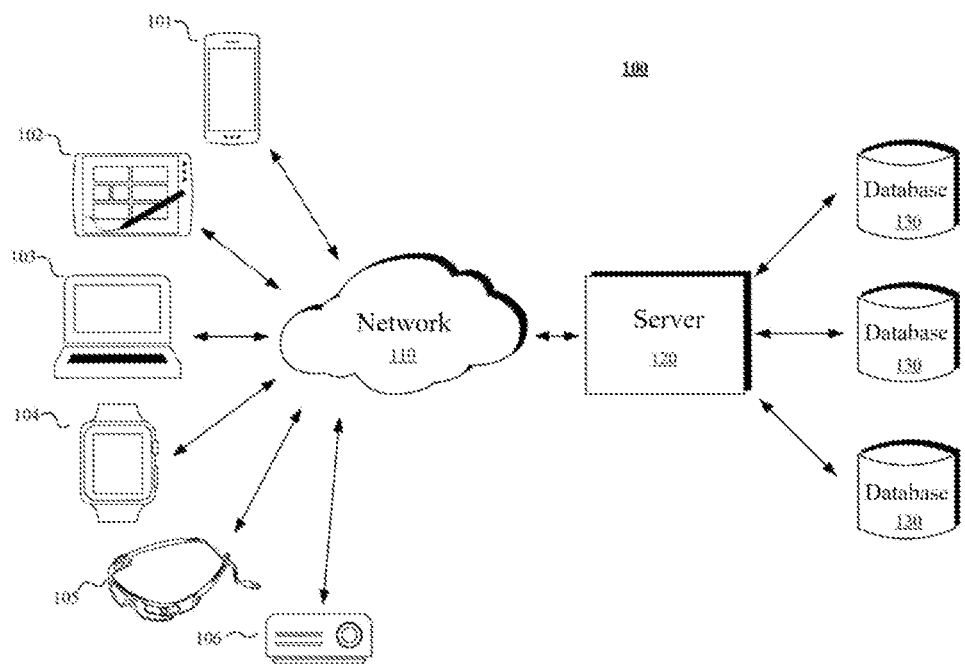
FIG. 1 is a schematic diagram of an example system in which various methods described herein can be implemented according to an embodiment of the present disclosure.

FIG. 1 is a schematic diagram of an example system 100 in which various methods and apparatuses described herein can be implemented according to an embodiment of the present disclosure. Referring to FIG. 1, the system 100 includes one or more client devices 101, 102, 103, 104, 105, and 106, a server 120, and one or more communications networks 110 that couple the one or more client devices to the server 120. The client devices 101, 102, 103, 104, 105, and 106 may be configured to execute one or more applications.

In an embodiment of the present disclosure, the server 120 can run one or more services or software applications that enable an image padding method to be performed.

In some embodiments, the server 120 may further provide other services or software applications that may include a non-virtual environment and a virtual environment. In some embodiments, these services may be provided as web-based services or cloud services, for example, provided to a user of the client device 101, 102, 103, 104, 105, and/or 106 in a software as a service (SaaS) model.

In the configuration shown in FIG. 1, the server 120 may include one or more components that implement functions performed by the server 120. These components may include software components, hardware components, or a combination thereof that can be executed by one or more processors. A user operating the client device 101, 102, 103, 104, 105, and/or 106 may sequentially use one or more client applications to interact with the server 120, thereby utilizing the services provided by these components. It should be understood that various system configurations are possible, which may be different from the system 100. Therefore, FIG. 1 is an example of the system for implementing various methods described herein, and is not intended to be limiting.

The client device 101, 102, 103, 104, 105, and/or 106 may be used to obtain file moving requests, etc. The client device may provide an interface that enables the user of the client device to interact with the client device. The client device may also output information to the user via the interface. Although FIG. 1 depicts only six types of client devices, those skilled in the art will understand that any number of client devices are possible in the present disclosure.

The client device 101, 102, 103, 104, 105, and/or 106 may include various types of computer devices, such as a portable handheld device, a general-purpose computer (such as a personal computer and a laptop computer), a workstation computer, a wearable device, a gaming system, a thin client, various messaging devices, and a sensor or other sensing devices. These computer devices can run various types and versions of software applications and operating systems, such as Microsoft Windows, Apple iOS, a UNIX-like operating system, and a Linux or Linux-like operating system (e.g., Google Chrome OS); or include various mobile operating systems, such as Microsoft Windows Mobile OS, iOS, Windows Phone, and Android. The portable handheld device may include a cellular phone, a smartphone, a tablet computer, a personal digital assistant (PDA), etc. The wearable device may include a head-mounted display and other devices. The gaming system may include various handheld gaming devices, Internet-enabled gaming devices, etc. The client device can execute various applications, such as various Internet-related applications, communication applications (e.g., email applications), and short message service (SMS) applications, and can use various communication protocols.

The network 110 may be any type of network well known to those skilled in the art, and it may use any one of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a public switched telephone network (PSTN), an infrared network, a wireless network (such as Bluetooth or Wi-Fi), and/or any combination of these and/or other networks.

The server 120 may include one or more general-purpose computers, a dedicated server computer (e.g., a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures relating to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any of the above-mentioned operating systems and any commercially available server operating system. The server 120 can also run any one of various additional server applications and/or middle-tier applications, including an HTTP server, an FTP server, a CGI server, a JAVA server, a database server, etc.

In some implementations, the server 120 may include one or more applications to analyze and merge data feeds and/or event updates received from users of the client devices 101, 102, 103, 104, 105, and 106. The server 120 may further include one or more applications to display the data feeds and/or real-time events via one or more display devices of the client devices 101, 102, 103, 104, 105, and 106.

In some implementations, the server 120 may be a server in a distributed system, or a server combined with a blockchain. The server 120 may alternatively be a cloud server, or an intelligent cloud computing server or intelligent cloud host with artificial intelligence technologies. The cloud server is a host product in a cloud computing service system, to overcome the shortcomings of difficult management and weak service scalability in conventional physical host and virtual private server (VPS) services.

The system 100 may further include one or more databases 130. In some embodiments, these databases can be used to store data and other information. For example, one or more of the databases 130 can be used to store data such as a path. The data repository 130 may reside in various locations. For example, a data repository used by the server 120 may be locally in the server 120, or may be remote from the server 120 and may communicate with the server 120 via a network-based or dedicated connection. The data repository 130 may be of different types. In some embodiments, the data repository used by the server 120 may be a database, such as a relational database. One or more of these databases can store, update, and retrieve data from or to the database, in response to a command.

In some embodiments, one or more of the databases 130 may also be used by an application to store application data. The database used by the application may be of different types, for example, may be a key-value repository, an object repository, or a regular repository backed by a file system.

The system 100 of FIG. 1 may be configured and operated in various manners, such that the various methods and apparatuses described according to the present disclosure can be applied.

Figure 2:
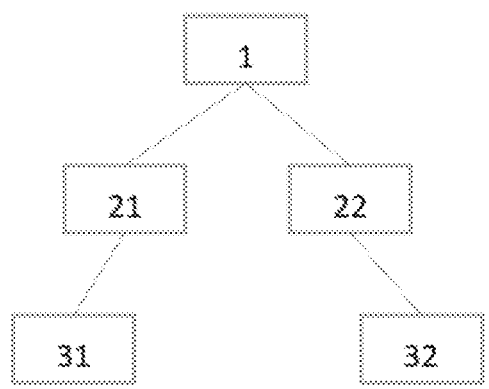
FIG. 2 is a schematic diagram of a directory tree structure having five nodes.
Figure 3:
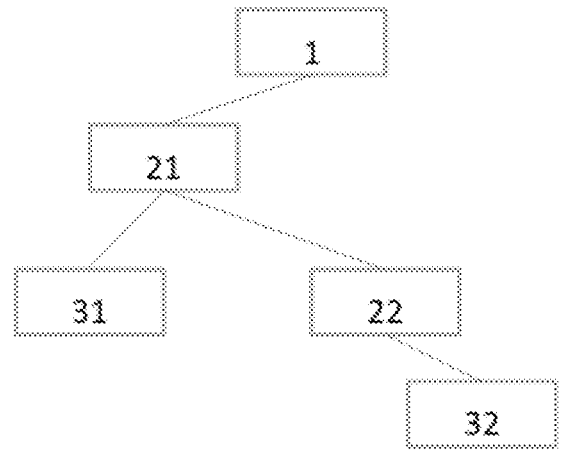
FIG. 3 is a schematic diagram of the directory tree structure shown in FIG. 2 for file moving.
Figure 4:
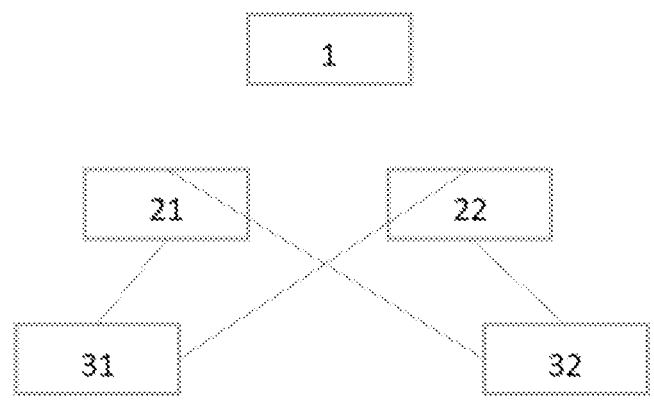
FIG. 4 is another schematic diagram of the directory tree structure shown in FIG. 2 for file moving.

FIG. 2 shows a directory tree structure having five nodes. After a moving operation with a parameter rename (1/22, 1/21/22) is performed on the directory tree structure, a directory tree structure shown in FIG. 3 can be obtained. Fully concurrent moving operations may cause a loop in a directory tree. For example, concurrently performed moving operations with parameters rename (1/21, 1/22/32/21) and rename (1/22, 1/21/31/22) may produce a directory tree structure shown in FIG. 4. In this case, all nodes except node 1 in FIG. 4 are inaccessible, which causes problems of inaccessibility of data and formation of a loop.

However, not all concurrent moving operations produce a loop. Parameters of file moving operations may be classified as inbound and outbound, with inbound corresponding to a destination path, and outbound corresponding to a source path. Generally, only "bidirectional" moving operations cause a loop. "Bidirectional" operations mean that there is a reverse relationship between an inbound parameter and an outbound parameter of different file moving operations. Therefore, comparing a parameter of a moving operation to be performed with a corresponding parameter of a moving operation being performed avoids "bidirectional" moving operations, thereby further preventing formation of a loop.

Figure 5:
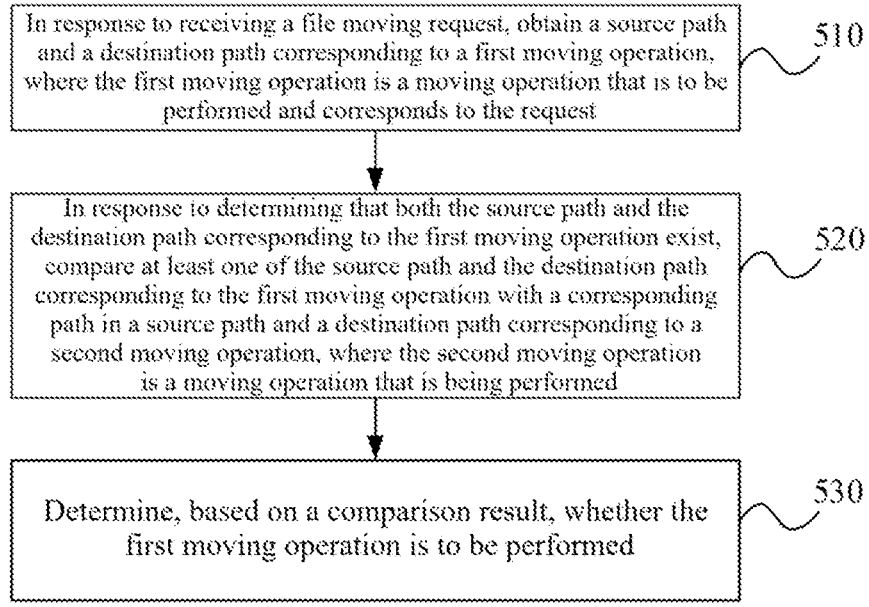
FIG. 5 is a flowchart of a file moving method according to an embodiment of the present disclosure.

Therefore, according to an embodiment of the present disclosure, provided is a file moving method 500. As shown in FIG. 5, the method includes: in response to receiving a file moving request, determining a source path and a destination path corresponding to a first moving operation, where the first moving operation is a moving operation that is to be performed and corresponds to the file moving request (step 510); in response to determining that both the source path corresponding to the first moving operation or the destination path corresponding to the first moving operation exist, comparing at least one of the source path corresponding to the first moving operation or the destination path corresponding to the first moving operation with a corresponding path of a source path corresponding to a second moving operation or a destination path corresponding to the second moving operation, where the second moving operation is a moving operation that is being performed (step 520); and determining, based on a result of the comparing, whether the first moving operation is to be performed (step 530).

According to the file moving method in this embodiment of the present disclosure, a path for a moving operation to be performed is compared with that for a moving operation being performed, to avoid the possibility of occurrence of a loop caused by a "reverse" operation, and a degree of concurrency of moving files in most scenarios is greatly improved, thereby improving operating efficiency.

In some examples, a file moving operation is also referred to as a renaming operation, and the file may also include a directory file, etc. A file system may be a local file system, a distributed file system, etc., for example, including but not limited to HDFS, XFS, EXT2/3/4, etc.

In some examples, the source path and destination path for the first moving operation may be determined based on a parameter of the first moving operation. Generally, metadata of the file system may be stored in a shared distributed memory. A parameter of the file moving request may be sent by an application using the file system, and a file system service receives a parameter of the application. For example, the file moving request may be triggered by a related operation, for example, dragging a file, typing in a related instruction, etc., of a user who uses the application on a client.

Figure 6:
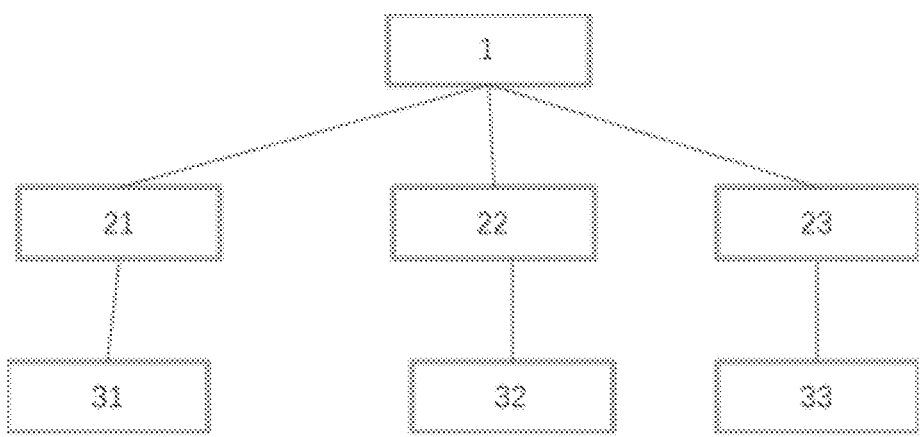
FIG. 6 is a schematic diagram of another directory tree structure having seven nodes.

A file moving operation of some file systems may include two parameters: a source path and a destination path. As shown in FIG. 6, for example, rename(1/21, 1/22/32/21) means that file node 21 is moved from node 1 to node 32. In addition, a file moving operation of some file systems may alternatively include four parameters: a source path parent directory node (inode), an original file name, a destination path parent directory node, and a destination file name, that is, rename(source_parent_inode, name, dest_parent_inode, name). In the case of four parameters, the first two parameters may be represented as source path information, and the third parameter may be represented as destination path information. As shown in FIG. 6, for example, there are file moving parameters of rename(1, 21, 32, 21), which also mean that file node 21 is moved from node 1 to node 32.

Certainly, other forms of parameters of the file moving operation are also possible, and are not limited herein.

After it is determined that both the source path corresponding to the first moving operation or the destination path corresponding to the first moving operation exist, it can be determined whether the first moving operation and the second moving operation may constitute "bidirectional" operations.

Figure 7:
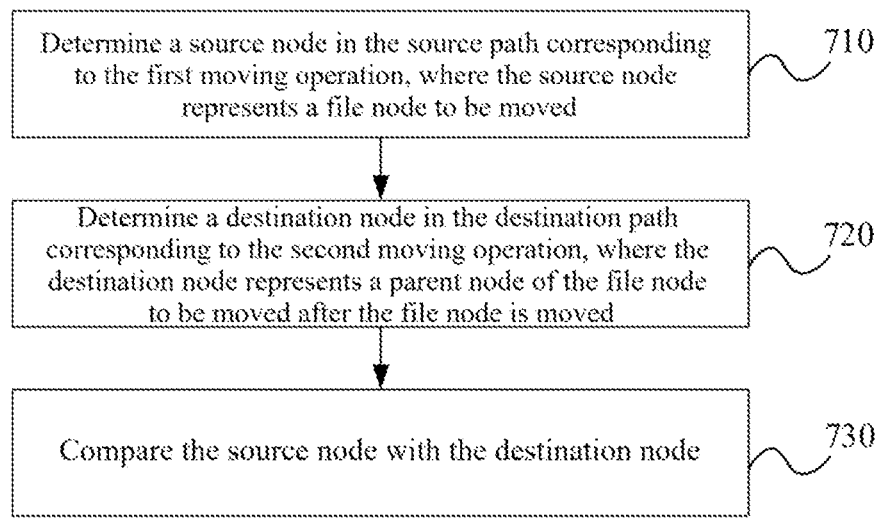
FIG. 7 is a flowchart of comparing a path corresponding to a first moving operation with a path corresponding to a second moving operation according to an embodiment of the present disclosure.

Therefore, according to some embodiments, as shown in FIG. 7, step 520 may include: determining a source node in the source path corresponding to the first moving operation, where the source node represents a file node to be moved (step 710); determining a destination node in the destination path corresponding to the second moving operation, where the destination node represents a parent node onto which the file node to be moved will be moved (step 720); and comparing the source node with the destination node (step 730). According to some embodiments, step 530 may include: in response to that the source node is a parent node or an ancestor node of the destination node, determining not to perform the first moving operation, e.g., skipping performing the first moving operation. That is, the first moving operation and the second moving operation may constitute "bidirectional" operations.

In some examples, still referring to FIG. 6, it is assumed that there are two file moving operations running concurrently: rename1(1, 21, 32, 21) and rename2(1, 22, 31, 22), where rename1 is the second moving operation and rename2 is the first moving operation. After it is determined that both the source path and the destination path for rename2 exist, the source node in the source path corresponding to rename2, namely, node 1, is determined, and destination node 32 in the destination path corresponding to rename1 is determined. It is determined that node 1 is an ancestor node of node 32, and rename2 and rename1 may constitute "bidirectional" operations. In this case, rename2 is not performed.

Figure 8:
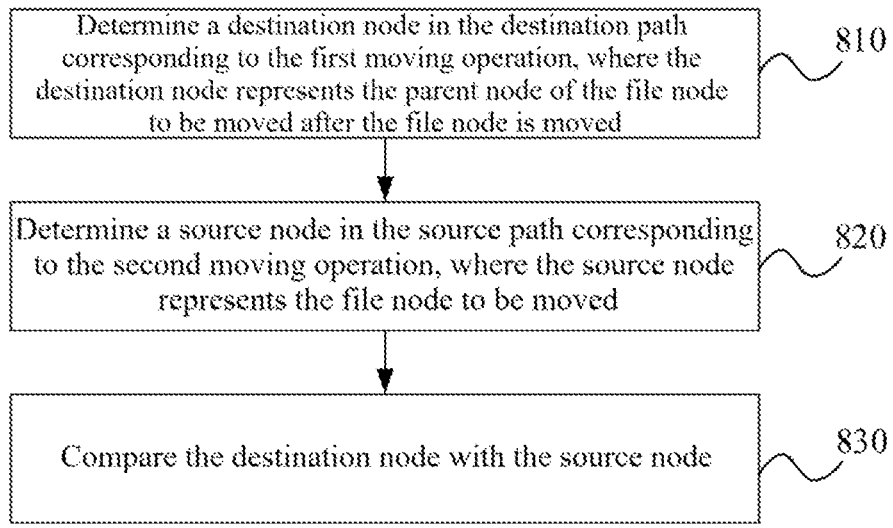
FIG. 8 is another flowchart of comparing a path corresponding to a first moving operation with a path corresponding to a second moving operation according to an embodiment of the present disclosure.

According to some embodiments, as shown in FIG. 8, step 520 may include: determining a destination node in the destination path corresponding to the first moving operation, where the destination node represents the parent node of the file node to be moved after the file node is moved (step 810); determining a source node in the source path corresponding to the second moving operation, where the source node represents the file node to be moved (step 820); and comparing the destination node with the source node (step 830).

According to some embodiments, step 530 may include: in response to the destination node being a child node or a descendant node of the source node, determining not to perform the first moving operation, e.g., skipping performing the first moving operation.

In some examples, still referring to FIG. 6, it is assumed that there are two file moving operations running concurrently: rename1(1, 21, 32, 21) and rename2(1, 22, 31, 22), where rename1 is the second moving operation and rename2 is the first moving operation. After it is determined that both the source path and the destination path for rename2 exist, it is determined that the destination node in the destination path corresponding to rename2 is node 31, and the source node in the source path corresponding to rename1 is node 1. It is determined that node 31 is a descendant node of node 1, and rename2 and rename1 may constitute "bidirectional" operations. In this case, rename2 is not performed.

In some embodiments, alternatively, both of the following operations may be performed: comparing the destination node in the destination path corresponding to the first moving operation with the source node in the source path corresponding to the second moving operation, and comparing the source node in the source path corresponding to the first moving operation with the destination node in the destination path corresponding to the second moving operation. When both conditions are satisfied, the first moving operation is not performed. This is not limited herein.

Figure 9:
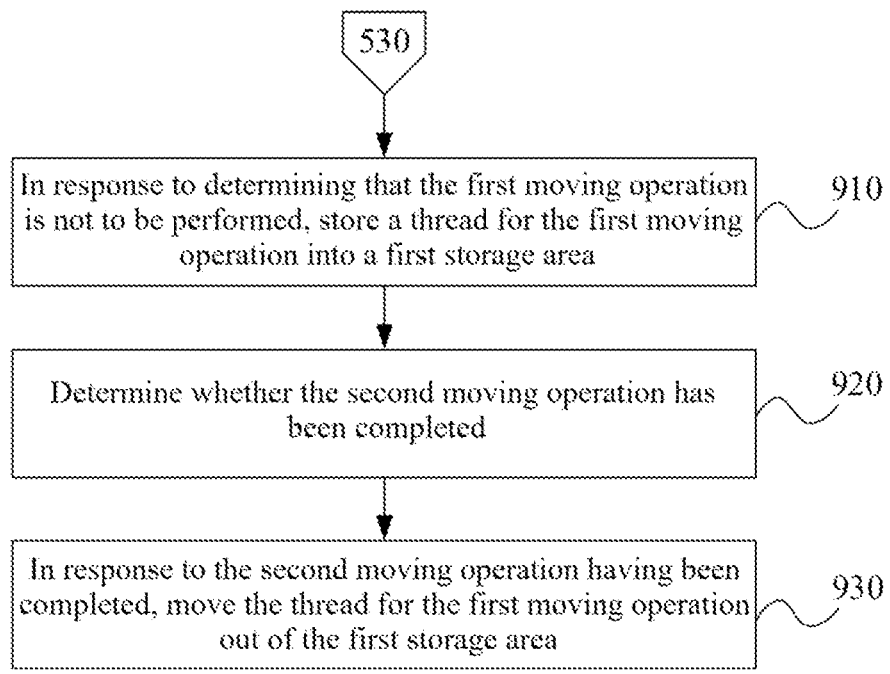
FIG. 9 is a further flowchart of the file moving method shown in FIG. 5.

According to some embodiments, as shown in FIG. 9, the method 500 may further include: in response to determining that the first moving operation is not to be performed, storing a thread at which the first moving operation is located into a first storage area (step 910); determining whether the second moving operation has been completed (step 920); and in response to the second moving operation having been completed, moving the thread at which the first moving operation is located out of the first storage area (step 930).

In some examples, after the thread for the first moving operation is moved out of the first storage area, it may be redetermined whether the source path corresponding to the first moving operation or the destination path corresponding to the first moving operation exist, so as to further redetermine whether the first moving operation is to be performed.

Figure 10:
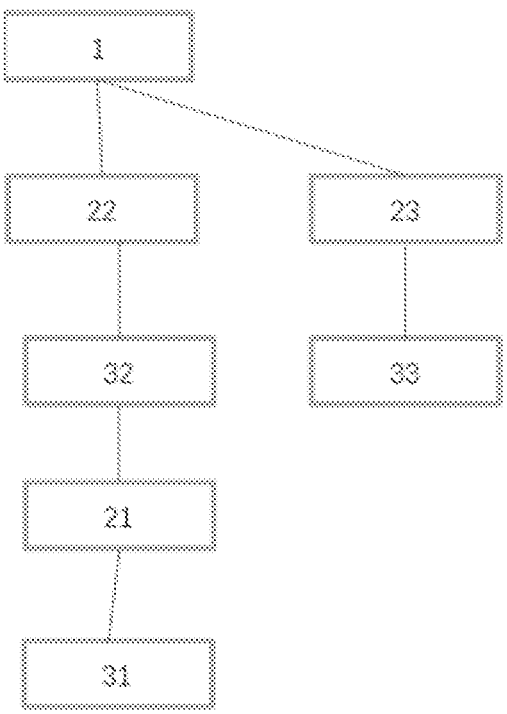
FIG. 10 is a schematic diagram of the directory tree structure shown in FIG. 6 for file moving.

In some examples, still referring to FIG. 6, in the foregoing embodiment, it has been determined that rename2 is not to be performed, and the thread (or process) for rename2 may be stored into the first cache area, so as to redetermine, after rename1 has been completed, whether rename2 can be performed. After rename1 has been completed, node 21/31 is moved below node 32, as shown in FIG. 10.

According to some embodiments, the first storage area may be a queue, a stack, etc. It should be understood that other areas that can be used to cache the first moving operation are also possible, including, but not limited to, local storage areas, cloud storage areas, etc.

According to some embodiments, the corresponding path in the source path and the destination path for the second moving operation may be stored in a second storage area for comparison, and in response to the second moving operation having been completed, the corresponding path in the second storage area is deleted. That is, the corresponding path for the second moving operation may be marked in the second storage area for comparison with other moving operations performed concurrently. In addition, after the second moving operation has been completed, a marker of the second moving operation is deleted from the second storage area.

For example, if it is determined that the first moving operation is to be performed, the source path corresponding to the first moving operation is stored into the second storage area for marking, and the moving operation is converted into the second moving operation. A destination path for another first moving operation running concurrently is compared with the marked source path to determine whether the another first moving operation is to be performed.

In some implementations, the destination path corresponding to the first moving operation may also be stored into the second storage area for marking, and the moving operation is converted into the second moving operation, that is, the moving operation being performed. A source path for another first moving operation running concurrently (the moving operation to be performed) is compared with the marked destination path to determine whether the another first moving operation is to be performed.

Figure 11:
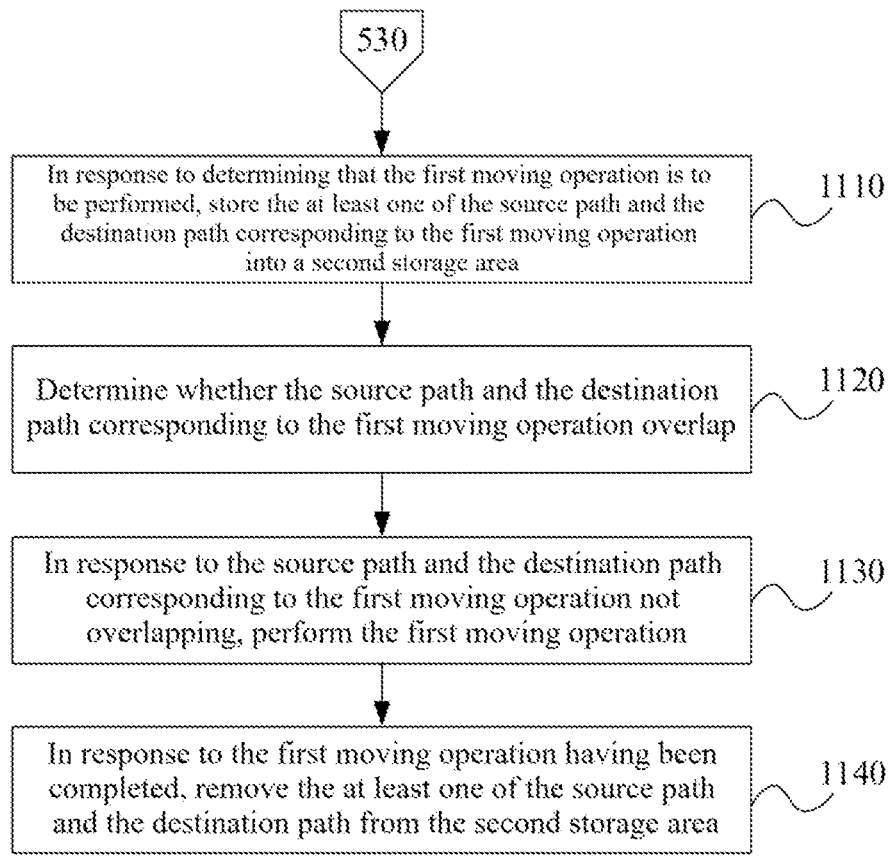
FIG. 11 is a further flowchart of the file moving method shown in FIG. 5.

Therefore, as shown in FIG. 11, the method 500 may further include: in response to determining that the first moving operation is to be performed, storing the at least one of the source path corresponding to the first moving operation or the destination path corresponding to the first moving operation into the second storage area (step 1110); determining whether the source path corresponding to the first moving operation overlaps with the destination path corresponding to the first moving operation (step 1120); in response to that the source path corresponding to the first moving operation does not overlap with the destination path corresponding to the first moving operation, performing the first moving operation (step 1130); and in response to that the performance of the first moving operation is completed, removing the at least one of the source path and the destination path of the first moving operation from the second storage area (step 1140).

While determining that the moving operation to be moved is to be performed, it is determined whether the source path and the destination path for the moving operation overlap, that is, the destination path and the source path for the moving operation are compared to determine whether the moving operation itself may cause a loop.

In some examples, that the source path and destination path overlap indicates that for one of the source path and the destination path, all nodes except a root node are included in the other path.

In some examples, before the first moving operation is performed, a path not stored into the second storage area may be compared again with a path stored into the second storage area to determine whether the source path corresponding to the first moving operation overlaps with the destination path corresponding to the first moving operation. The comparison process is the same as the above-described process of comparing the at least one of the source path corresponding to the first moving operation or the destination path corresponding to the first moving operation with the corresponding path in the source path and the destination path corresponding to the second moving operation. Details are not repeated herein.

Still referring to FIG. 10, whether rename2(1, 22, 31, 22) can be performed is redetermined. According to parameter information of rename2, its source path can be represented as 1/22, and the destination path can be represented as 1/22/32/21/31. In this case, the source path and the destination path overlap, and then rename2 is not performed.

Figure 12:
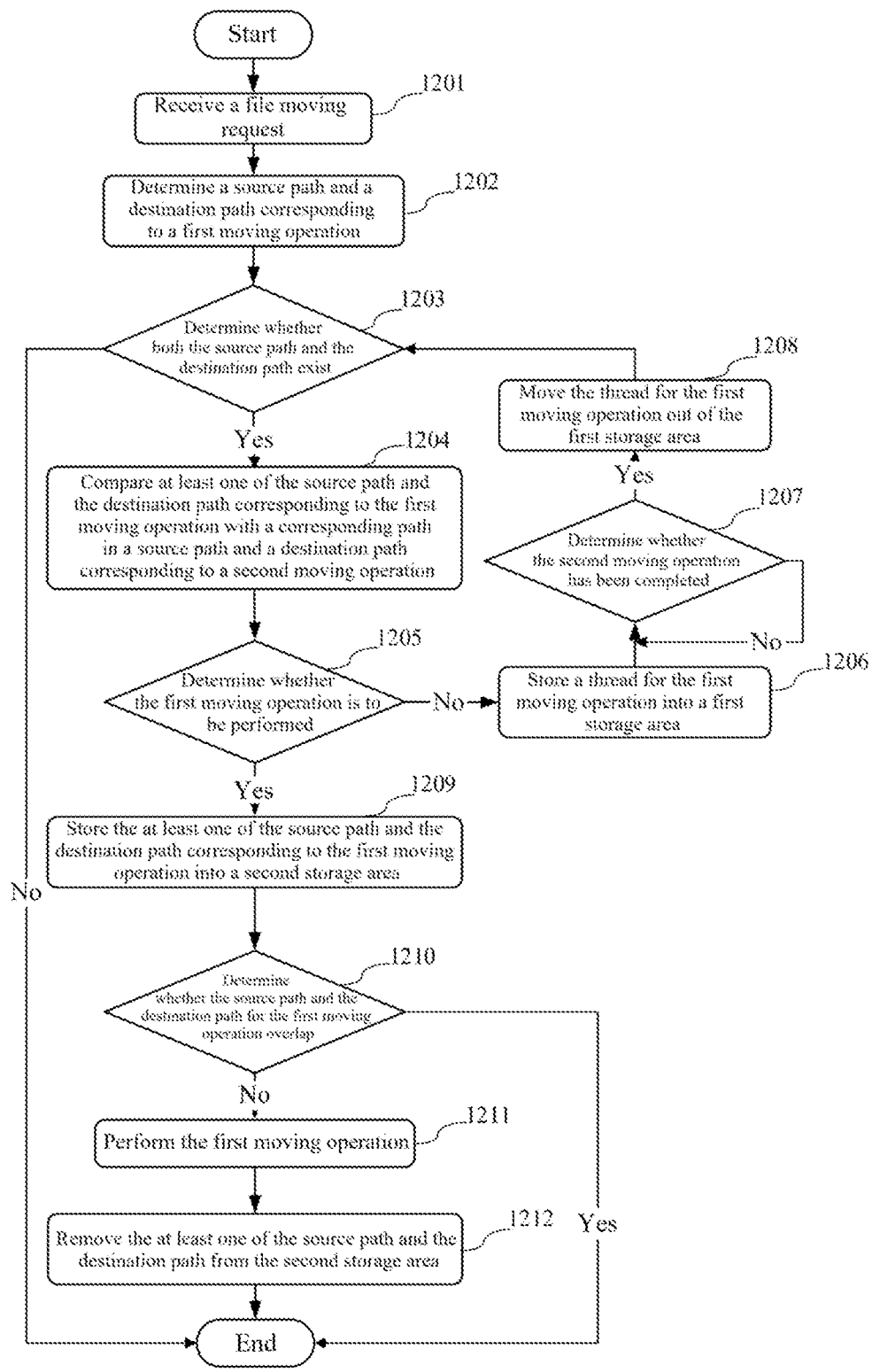
FIG. 12 is a flowchart of a file moving method according to an example embodiment of the present disclosure.

FIG. 12 is a flowchart of a file moving method according to an example embodiment of the present disclosure. As shown in FIG. 12, after a file moving request is received (step 1201), a source path and a destination path corresponding to a first moving operation are determined (step 1202), so as to further determine whether both the source path corresponding to the first moving operation and the destination path corresponding to the first moving operation exist (step 1203). If it is determined that both the source path and the destination path exist (step 1203, "Yes"), at least one of the source path corresponding to the first moving operation or the destination path corresponding to the first moving operation is compared with a corresponding path of a source path corresponding to a second moving operation or a destination path corresponding to the second moving operation (step 1204) to determine, based on a result of the comparing, whether the first moving operation is to be performed (Step 1205). If it is determined that the first moving operation is not to be performed (step 1205, "No"), a thread for the first moving operation is stored into a first storage area (step 1206), and it is determined whether the second moving operation has been completed (step 1207). After the second moving operation has been completed (step 1207, "Yes"), the thread for the first moving operation is moved out of the first storage area (step 1208), and it is further determined whether the source path and the destination path for the first moving operation exist. If it is determined that the first moving operation is to be performed (step 1205, "Yes"), the at least one of the source path corresponding to the first moving operation or the destination path corresponding to the first moving operation is stored into a second storage area (step 1209), and then it is determined whether the source path and the destination path for the first moving operation overlap (step 1210). When the source path and the destination path for the first moving operation do not overlap (step 1210, "No"), the first moving operation is performed (step 1211). After the first moving operation has been completed, the at least one of the source path and the destination path of the first moving operation for the first moving operation is removed from the second storage area (step 1212).

According to some embodiments, the method may further include: marking the at least one of the source path corresponding to the first moving operation or the destination path corresponding to the first moving operation; and in response to the second moving operation having been completed, moving the first moving operation out of the first storage area based on the marking.

For example, the at least one of the source path corresponding to the first moving operation or the destination path corresponding to the first moving operation may be stored for marking. After the second moving operation has been completed, the first moving operation that has a "reverse" relationship with the completed moving operation is notified based on the marking, so as to move it out of the first storage area.

According to some embodiments, the determining whether the second moving operation has been completed includes: reading the second storage area at a predetermined time period, to determine whether the second moving operation has been completed.

For example, the thread for the first moving operation that is stored into the first storage area may read the second storage area at a predetermined time period, to actively obtain whether a moving operation having a "reverse" relationship with the first moving operation has been completed.

Figure 13:
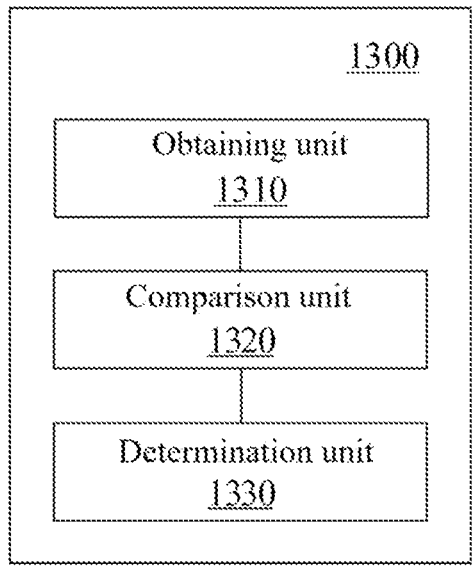
FIG. 13 is a structural block diagram of a file moving apparatus according to an embodiment of the present disclosure.

According to an embodiment of the present disclosure, there is further provided a file moving apparatus 1300. As shown in FIG. 13, the apparatus includes: an obtaining unit 1310 configured to, in response to receiving a file moving request, determine a source path and a destination path corresponding to a first moving operation, where the first moving operation is a moving operation that is to be performed and corresponds to the file moving request; a comparison unit 1320 configured to, in response to determining that both the source path corresponding to the first moving operation or the destination path corresponding to the first moving operation exist, compare at least one of the source path corresponding to the first moving operation or the destination path corresponding to the first moving operation with a corresponding path of a source path corresponding to a second moving operation or a destination path corresponding to the second moving operation, where the second moving operation is a moving operation that is being performed; and a second determination unit 1330 configured to determine, based on a result of the comparing, whether the first moving operation is to be performed.

Herein, the operations of the foregoing units 1310 to 1330 of the file moving apparatus 1300 are respectively similar to the operations of steps 510 to 530 described above. Details are not repeated herein.

According to an example embodiment of the present disclosure, there is further provided an electronic device, including: at least one processor; and a memory communicatively connected to the at least one processor, where the memory stores instructions executable by the at least one processor, and when executed by the at least one processor, the instructions cause the at least one processor to perform the file moving method described above.

According to an example embodiment of the present disclosure, there is further provided a non-transitory computer-readable storage medium storing computer instructions, where the computer instructions are used to cause the computer to perform the file moving method described above.

According to an example embodiment of the present disclosure, there is further provided a computer program product, including a computer program, where when the computer program is executed by a processor, the file moving method described above is implemented.

Figure 14:
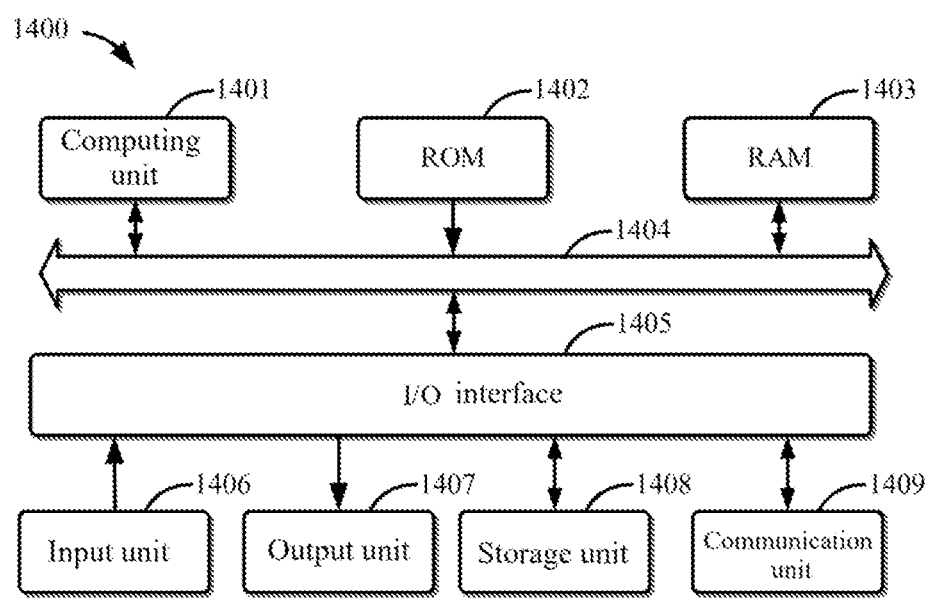
FIG. 14 is a structural block diagram of an example electronic device that can be used to implement an embodiment of the present disclosure.

Referring to FIG. 14, a structural block diagram of an electronic device 1400 that can serve as a server or a client of the present disclosure is now described, which is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 14, the device 1400 includes a computing unit 1401, which may perform various appropriate actions and processing according to a computer program stored in a read-only memory (ROM) 1402 or a computer program loaded from a storage unit 1408 to a random access memory (RAM) 1403. The RAM 1403 may further store various programs and data required for the operation of the device 1400. The computing unit 1401, the ROM 1402, and the RAM 1403 are connected to each other through a bus 1404. An input/output (I/O) interface 1405 is also connected to the bus 1404.

A plurality of components in the device 1400 are connected to the I/O interface 1405, including: an input unit 1406, an output unit 1407, the storage unit 1408, and a communication unit 1409. The input unit 1406 may be any type of device capable of entering information to the device 1400. The input unit 1406 can receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 1407 may be any type of device capable of presenting information, and may include, but is not limited to, a display, a speaker, a video/audio output terminal, a vibrator, and/or a printer. The storage unit 1408 may include, but is not limited to, a magnetic disk and an optical disc. The communication unit 1409 allows the device 1400 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, a 1302.11 device, a Wi-Fi device, a WiMAX device, a cellular communication device and/or the like.

The computing unit 1401 may be various general-purpose and/or special-purpose processing components with processing and computing capabilities. Some examples of the computing unit 1401 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 1401 performs the various methods and processing described above, for example, the method 500. For example, in some embodiments, the method 500 may be implemented as a computer software program, which is tangibly contained in a machine-readable medium, such as the storage unit 1408. In some embodiments, a part or all of the computer program may be loaded and/or installed onto the device 1400 via the ROM 1402 and/or the communication unit 1409. When the computer program is loaded to the RAM 1403 and executed by the computing unit 1401, one or more steps of the method 500 described above can be performed. Alternatively, in other embodiments, the computing unit 1401 may be configured, by any other suitable means (for example, by means of firmware), to perform the method 500.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: the systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

A program code used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, voice input, or tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium.

Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other.

It should be understood that steps may be reordered, added, or deleted based on the various forms of procedures shown above. For example, the steps recorded in the present disclosure can be performed in parallel, in order, or in a different order, provided that the desired result of the technical solutions disclosed in the present disclosure can be achieved, which is not limited herein.

Although the embodiments or examples of the present disclosure have been described with reference to the drawings, it should be appreciated that the methods, systems, and devices described above are merely example embodiments or examples, and the scope of the present disclosure is not limited by the embodiments or examples, but only defined by the appended authorized claims and equivalent scopes thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented file moving method, comprising:
   in response to receiving a file moving request, determining a source path corresponding to a first moving operation and a destination path corresponding to the first moving operation, wherein the first moving operation is a moving operation that is to be performed and corresponds to the file moving request;
   in response to determining that both the source path corresponding to the first moving operation or the destination path corresponding to the first moving operation exist, comparing at least one of the source path corresponding to the first moving operation or the destination path corresponding to the first moving operation with a corresponding path of a source path corresponding to a second moving operation or a destination path corresponding to the second moving operation, wherein the second moving operation is a moving operation that is being performed;
   determining, based on a result of the comparing, whether the first moving operation is to be performed;

in response to determining that the first moving operation is not to be performed, storing a thread at which the first moving operation is located into a first storage area in a storage device; and in response to that the performance of the second moving operation is completed, moving the thread at which the first moving operation is located out of the first storage area, wherein the comparing the at least one of the source path corresponding to the first moving operation or the destination path corresponding to the first moving operation with the corresponding path of the source path corresponding to the second moving operation or the destination path corresponding to the second moving operation comprises:

determining a source node in the source path corresponding to the first moving operation, wherein the source node represents a file node to be moved;

determining a destination node in the destination path corresponding to the second moving operation, wherein the destination node represents a parent node onto which the file node to be moved will be moved; and comparing the source node with the destination node, and wherein the determining, based on a result of the comparing, whether the first moving operation is to be performed comprises:

in response to that the source node is a parent node or an ancestor node of the destination node, determining that the first moving operation is not to be performed.

2. The method according to claim 1, wherein the corresponding path is stored in a second storage area, and in response to that performance of the second moving operation is completed, the corresponding path in the second storage area is deleted; and the method further comprises:

in response to determining that the first moving operation is to be performed, storing the at least one of the source path corresponding to the first moving operation or the destination path corresponding to the first moving operation into the second storage area;

determining whether the source path corresponding to the first moving operation overlaps with the destination path corresponding to the first moving operation;

in response to that the source path corresponding to the first moving operation does not overlap with the destination path corresponding to the first moving operation, performing the first moving operation; and in response to that the performance of the first moving operation is completed, removing the at least one of the source path and the destination path of the first moving operation from the second storage area.

3. The method according to claim 1, wherein the comparing at least one of the source path corresponding to the first moving operation or the destination path corresponding to the first moving operation with the corresponding path of the source path corresponding to the second moving operation or the destination path corresponding to the second moving operation comprises:

determining a destination node in the destination path corresponding to the first moving operation, wherein the destination node represents a parent node onto which the file node to be moved will be moved;

determining a source node in the source path corresponding to the second moving operation, wherein the source node represents the file node to be moved; and comparing the destination node with the source node.

4. The method according to claim 3, wherein the determining, based on a result of the comparing, whether the first moving operation is to be performed comprises:

in response to the destination node being a child node or a descendant node of the source node, determining that the first moving operation is not to be performed.

5. The method according to claim 2, further comprising:

marking the at least one of the source path corresponding to the first moving operation or the destination path corresponding to the first moving operation; and in response to that performance of the second moving operation is completed, moving the thread at which the first moving operation is located out of the first storage area based on the marking.

6. The method according to claim 1, wherein the first storage area comprises at least one from a group consisting of: a queue and a stack.

7. An electronic device, comprising:

at least one processor; and a memory communicatively connected to the at least one processor, wherein the memory stores instructions executable by the at least one processor, and when executed by the at least one processor, the instructions cause the at least one processor to:

in response to receiving a file moving request, determine a source path and a destination path corresponding to a first moving operation, wherein the first moving operation is a moving operation that is to be performed and corresponds to the file moving request;

in response to determining that both the source path corresponding to the first moving operation or the destination path corresponding to the first moving operation exist, compare at least one of the source path corresponding to the first moving operation or the destination path corresponding to the first moving operation with a corresponding path of a source path corresponding to a second moving operation or a destination path corresponding to the second moving operation, wherein the second moving operation is a moving operation that is being performed;

determine, based on a result of the comparing, whether the first moving operation is to be performed;

in response to determining that the first moving operation s not to be performed, store a thread at which the first moving operation is located into a first storage area in a storage device; and in response to that the performance of the second moving operation is completed, move the thread at which the first moving operation is located out of the first storage area, wherein in the comparing the at least one of the source path corresponding to the first moving operation or the destination path corresponding to the first moving operation with the corresponding path of the source path corresponding to the second moving operation or the destination path corresponding to the second moving operation, the instructions cause the at least one processor to:

determine a source node in the source path corresponding to the first moving operation, wherein the source node represents a file node to be moved;

determine a destination node in the destination path corresponding to the second moving operation, wherein the destination node represents a parent node onto which the file node to be moved will be moved; and compare the source node with the destination node, and wherein in the determining, based on the result of the comparing, whether the first moving operation is to be performed, the instructions cause the at least one processor to:

in response to that the source node is a parent node or an ancestor node of the destination node, determine that the first moving operation is not to be performed.

8. The electronic device according to claim 7, wherein at least one of the source path corresponding to a second moving operation and destination path corresponding to the second moving operation is stored in a second storage area, and in response to that performance of the second moving operation is completed, the at least one of the source path corresponding to a second moving operation and destination path corresponding to the second moving operation in the second storage area is deleted; and wherein the instructions further cause the at least one processor to:

in response to determining that the first moving operation is to be performed, store the at least one of the source path corresponding to the first moving operation or the destination path corresponding to the first moving operation into the second storage area;

determine whether the source path corresponding to the first moving operation overlaps with the destination path corresponding to the first moving operation;

in response to that the source path corresponding to the first moving operation does not overlap with the destination path corresponding to the first moving operation, perform the first moving operation; and in response to that the performance of the first moving operation is completed, removing the at least one of the source path and the destination path of the first moving operation from the second storage area.

9. The electronic device according to claim 7, wherein in the at least one comparison operation, the instructions cause the at least one processor to:

determine a destination node in the destination path corresponding to the first moving operation, wherein the destination node represents a parent node onto which a file node to be moved will be moved;

determine a source node in the source path corresponding to the second moving operation, wherein the source node represents the file node to be moved; and compare the destination node with the source node.

10. The electronic device according to claim 9, wherein in the determining, based on the result of the comparing, whether the first moving operation is to be performed, the instructions cause the at least one processor to:

in response to the destination node being a child node or a descendant node of the source node, determine that the first moving operation is not to be performed.

11. The electronic device according to claim 8, wherein the instructions further cause the at least one processor to:

mark the at least one of the source path corresponding to the first moving operation or the destination path corresponding to the first moving operation; and in response to that performance of the second moving operation is completed, move the first moving operation out of the first storage area based on the marking.

12. The electronic device according to claim 7, wherein the first storage area comprises at least one from a group consisting of: a queue and a stack.

13. A non-transitory computer-readable storage medium storing computer instructions, wherein the computer instructions are used to cause the computer to:

in response to receiving a file moving request, determine a source path and a destination path corresponding to a first moving operation, wherein the first moving operation is a moving operation that is to be performed and corresponds to the file moving request;

in response to determine that both the source path corresponding to the first moving operation or the destination path corresponding to the first moving operation exist, compare at least one of the source path corresponding to the first moving operation or the destination path corresponding to the first moving operation with a corresponding path of a source path corresponding to a second moving operation or a destination path corresponding to the second moving operation, wherein the second moving operation is a moving operation that is being performed; and determine, based on a result of the comparing, whether the first moving operation is to be performed;

in response to determining that the first moving operation is not to be performed, store a thread at which the first moving operation is located into a first storage area in a storage device; and in response to that the performance of the second moving operation is completed, move the thread at which the first moving operation is located out of the first storage area, wherein the comparing the at least one of the source path corresponding to the first moving operation or the destination path corresponding to the first moving operation with the corresponding path of the source path corresponding to the second moving operation or the destination path corresponding to the second moving operation comprises:

determining a source node in the source path corresponding to the first moving operation, wherein the source node represents a file node to be moved;

determining a destination node in the destination path corresponding to the second moving operation, wherein the destination node represents a parent node onto which the file node to be moved will be moved; and comparing the source node with the destination node, and wherein the determining, based on a result of the comparing, whether the first moving operation is to be performed comprises:

in response to that the source node is a parent node or an ancestor node of the destination node, determining that the first moving operation is not to be performed.

* * * * *